United States Patent
Ando

(10) Patent No.: US 11,648,911 B2
(45) Date of Patent: May 16, 2023

(54) VEHICLE SYSTEM AND VEHICLE CONTROL METHOD

(71) Applicant: TOYOTA JIDOSHA KABUSHIKI KAISHA, Toyota (JP)

(72) Inventor: Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 533 days.

(21) Appl. No.: 16/834,011

(22) Filed: Mar. 30, 2020

(65) Prior Publication Data

US 2020/0377055 A1 Dec. 3, 2020

(30) Foreign Application Priority Data

Jun. 3, 2019 (JP) .............................. JP2019-103800

(51) Int. Cl.
*B60R 25/01* (2013.01)
*B60W 60/00* (2020.01)
*B60R 25/00* (2013.01)

(52) U.S. Cl.
CPC ............ *B60R 25/01* (2013.01); *B60R 25/003* (2013.01); *B60W 60/0016* (2020.02); *B60W 2520/06* (2013.01)

(58) Field of Classification Search
CPC ............ B60R 25/003; B60W 60/0025; B60W 50/0098; B60W 60/001; B60W 10/04; B60W 10/06; B60W 2050/0075; B60W 30/182; B60W 50/045; B60W 50/04
See application file for complete search history.

(56) References Cited

U.S. PATENT DOCUMENTS

| | | | | |
|---|---|---|---|---|
| 9,797,247 | B1* | 10/2017 | Nelson | .................. G05D 1/024 |
| 2004/0100148 | A1* | 5/2004 | Kindo | ................. B60R 16/0315 |
| | | | | 307/66 |
| 2008/0288150 | A1* | 11/2008 | Isogai | ....................... B60T 7/22 |
| | | | | 701/70 |
| 2013/0198737 | A1* | 8/2013 | Ricci | ....................... B60R 25/01 |
| | | | | 717/174 |

(Continued)

FOREIGN PATENT DOCUMENTS

| | | | | |
|---|---|---|---|---|
| JP | 2004-161263 | A | 6/2004 | |
| JP | 2004161263 | A * | 6/2004 | ......... B60R 16/0315 |

(Continued)

*Primary Examiner* — Redhwan K Mawari
(74) *Attorney, Agent, or Firm* — Oliff PLC

(57) ABSTRACT

A vehicle system configured to control a vehicle provided with a vehicle platform that includes a drive unit, an auxiliary device, a first controller, a second controller, a high-voltage electric power source, a low-voltage electric power source, an autonomous driving platform that performs autonomous driving control, and a vehicle control interface that connects the vehicle platform and the autonomous driving platform to each other and is configured to convert a first control instruction into a second control instruction with respect to the vehicle platform, and transmit the second control instruction. The vehicle system includes a controlling device configured to cause the second controller and the vehicle control interface to enter an operating state and cut off supply of electric power from the high-voltage electric power source to the drive unit.

6 Claims, 9 Drawing Sheets

(56) References Cited

U.S. PATENT DOCUMENTS

| | | | |
|---|---|---|---|
| 2014/0310739 A1* | 10/2014 | Ricci | G06Q 20/321 |
| | | | 725/75 |
| 2015/0233719 A1* | 8/2015 | Cudak | B60R 25/241 |
| | | | 701/23 |
| 2019/0031202 A1* | 1/2019 | Takeda | B60T 8/17557 |
| 2019/0139162 A1* | 5/2019 | Sawada | G06Q 10/02 |
| 2020/0324788 A1* | 10/2020 | Ando | B60W 60/001 |
| 2020/0324789 A1* | 10/2020 | Ando | B60W 60/0025 |
| 2020/0331494 A1* | 10/2020 | Ando | B60W 50/0098 |
| 2020/0334926 A1* | 10/2020 | Tsurumi | G07C 5/0808 |
| 2020/0377055 A1* | 12/2020 | Ando | B60W 50/0098 |
| 2020/0377127 A1* | 12/2020 | Ando | B60W 50/0205 |

FOREIGN PATENT DOCUMENTS

| | | | |
|---|---|---|---|
| JP | 2008-279983 A | | 11/2008 |
| JP | 2011-000894 A | | 1/2011 |
| JP | 2011000894 A | * | 1/2011 |
| JP | 2018-132015 A | | 8/2018 |

\* cited by examiner

VEHICLE SYSTEM AND VEHICLE CONTROL METHOD

INCORPORATION BY REFERENCE

The disclosure of Japanese Patent Application No. 2019-103800 filed on Jun. 3, 2019 including the specification, drawings and abstract is incorporated herein by reference in its entirety.

BACKGROUND

1. Technical Field

The disclosure relates to control of a vehicle.

2. Description of Related Art

Research on autonomous driving of a vehicle is being actively carried out. For example, described in Japanese Unexamined Patent Application Publication No. 2018-132015 (JP 2018-132015 A) is a vehicle system in which an autonomous driving ECU having a function of sensing the vicinity of a vehicle is provided in the vehicle separately from an engine ECU and the autonomous driving ECU issues a command to the engine ECU via a vehicle-mounted network. When an ECU that manages power of a vehicle and an ECU for autonomous driving are made independent of each other as in JP 2018-132015 A, it is possible to add an autonomous driving function without applying a great change to an existing vehicle platform. In addition, it can be expected that a third party is prompted to develop an autonomous driving function.

SUMMARY

In a case where a door can be unlocked by, for example, the ECU for autonomous driving when the vehicle is in a state of being able to travel by means of the ECU for autonomous driving, there is a possibility that the door is unlocked by the ECU for autonomous driving while the vehicle is traveling. With regard to this, when the door can be unlocked solely in a case where the vehicle is in a state of being not able to travel, the door being unlocked while the vehicle is traveling can be suppressed. However, when supply of electric power from an electric power source is stopped to cause the vehicle to enter a state of being not able to travel, supply of electric power to an actuator that unlocks the door may also be stopped such that it becomes difficult to unlock the door.

The disclosure provides a vehicle system and a vehicle control method with which it is possible to operate a device not relating to traveling of a vehicle when the vehicle is in a state of being not able to travel.

A first aspect of the disclosure relates to a vehicle system configured to control a vehicle. The vehicle is provided with a vehicle platform, an autonomous driving platform, and a vehicle control interface. The vehicle platform includes a drive unit configured to drive the vehicle, an auxiliary device not relating to the driving of the vehicle, a first controller configured to perform control relating to traveling of the vehicle with respect to the drive unit, a second controller configured to perform control not relating to traveling of the vehicle with respect to the auxiliary device, a high-voltage electric power source with which the drive unit is operable, and a low-voltage electric power source, which is an electric power source of which the voltage is lower than the voltage of the high-voltage electric power source and with which the auxiliary device is operable and the drive unit is not operable. The autonomous driving platform includes a third controller configured to perform autonomous driving control of the vehicle. The vehicle control interface connects the vehicle platform and the autonomous driving platform to each other and is configured to acquire a first control instruction including a plurality of commands with respect to the vehicle platform from the third controller, convert the first control instruction into a second control instruction with respect to the first controller or the second controller, and transmit the second control instruction to the first controller or the second controller. The vehicle system includes a controlling device configured to cause the second controller and the vehicle control interface to enter an operating state and cut off supply of electric power from the high-voltage electric power source to the drive unit.

A second aspect of the disclosure relates to a vehicle control method of controlling a vehicle. The vehicle is provided with a vehicle platform, an autonomous driving platform, and a vehicle control interface. The vehicle platform includes a drive unit configured to drive the vehicle, an auxiliary device not relating to the driving of the vehicle, a first controller configured to perform control relating to traveling of the vehicle with respect to the drive unit, a second controller configured to perform control not relating to traveling of the vehicle with respect to the auxiliary device, a high-voltage electric power source with which the drive unit is operable, and a low-voltage electric power source, which is an electric power source of which the voltage is lower than the voltage of the high-voltage electric power source and with which the auxiliary device is operable and the drive unit is not operable. The autonomous driving platform includes a third controller configured to perform autonomous driving control of the vehicle. The vehicle control interface connects the vehicle platform and the autonomous driving platform to each other and is configured to acquire a first control instruction including a plurality of commands with respect to the vehicle platform from the third controller, convert the first control instruction into a second control instruction with respect to the first controller or the second controller, and transmit the second control instruction to the first controller or the second controller. The vehicle control method includes causing a computer to receive a request to switch an electric power mode, and switch the electric power mode to a wake mode in which the second controller and the vehicle control interface enter an operating state and supply of electric power from the high-voltage electric power source to the drive unit is cut off in a case where the request is received when the electric power mode is a sleep mode in which the first controller, the second controller, and the vehicle control interface enter a stopped state and supply of electric power from the high-voltage electric power source to the drive unit is cut off.

A third aspect of the disclosure relates to an information processing method performed by the vehicle system, a program for causing the computer to perform the information processing method, or a non-transitory computer-readable storage medium storing the program.

According to the aspects of the disclosure, it is possible to operate a device not relating to traveling of a vehicle when the vehicle is in a state of being not able to travel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A configuration in which a vehicle platform including a computer that manages power of a vehicle and an autonomous driving platform that performs determination relating to autonomous driving are installed in a vehicle system independently of each other can be conceived. For example, the autonomous driving platform senses the vicinity of the vehicle and transmits a control instruction to an existing vehicle platform based on the result of a sensing operation. With such a configuration, the platforms can be developed by vendors independent of each other and thus it is possible to prompt a third party to develop an autonomous driving function.

Meanwhile, in a case where platforms developed by different vendors are caused to coexist in the same vehicle system, that is, in a case where a power system for a vehicle and an autonomous driving system that issues a control instruction to the power system are connected to the same vehicle-mounted network, several problems occur. One of the problems is a problem that a command for controlling the vehicle platform is different for each maker or each vehicle type. For example, since the input and output of an engine ECU are different for each maker or each vehicle type, making an autonomous driving ECU conformable to every vehicle type is costly. Furthermore, since various items of information for controlling the vehicle flow to the vehicle-mounted network, it is not preferable that the autonomous driving platform (which is manufactured by third person not directly relating to vehicle platform) is permitted to access the information without limitation.

Figure 1:
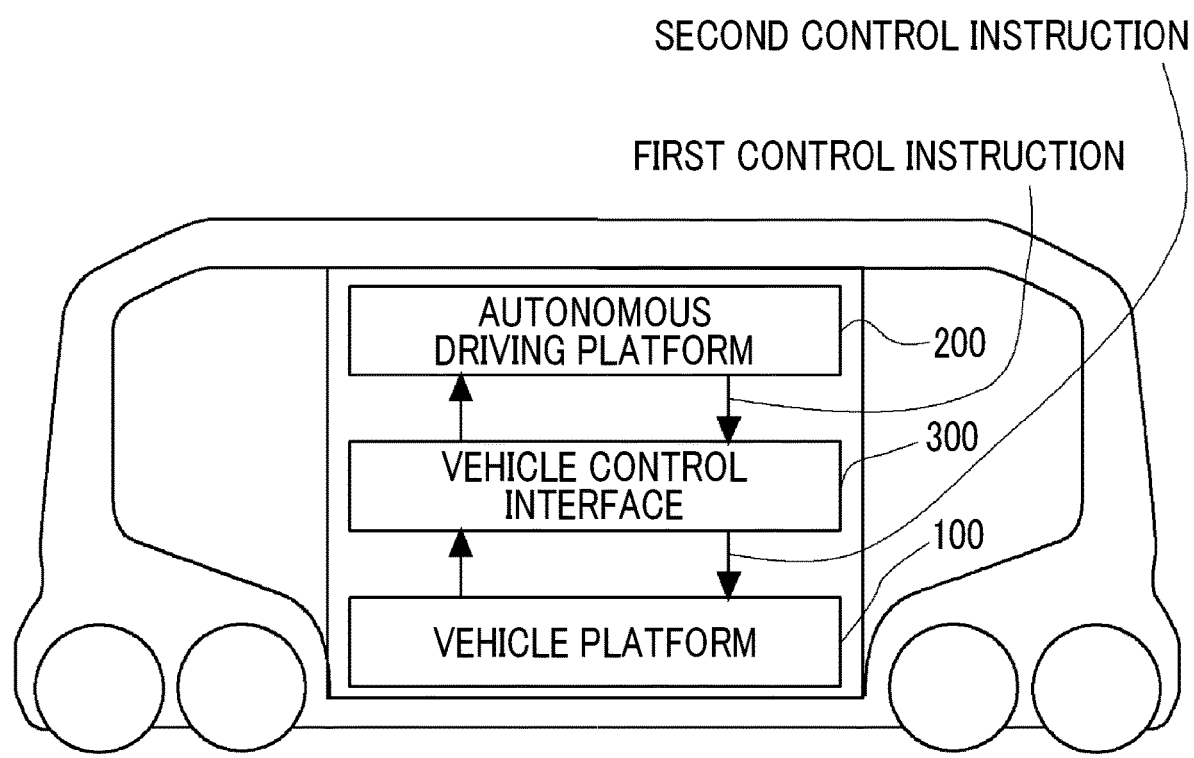
FIG. 1 is a schematic diagram illustrating a vehicle system according to an embodiment.

Therefore, in a vehicle system according to an embodiment, a vehicle platform and an autonomous driving platform are connected to each other via a vehicle control interface such that information is relayed therebetween. FIG. 1 is a schematic diagram illustrating the vehicle system according to the present embodiment. The vehicle platform 100 is a platform including a first controller that performs control relating to traveling of a vehicle and a second controller that performs control not relating to traveling of the vehicle. In addition, an autonomous driving platform 200 is a platform including a third controller (for example, autonomous driving ECU) that performs autonomous driving control of the vehicle. The autonomous driving platform 200 may include means for sensing the vicinity of the vehicle or means for generating a plan about a traveling operation based on the result of a sensing operation.

The vehicle control interface 300 is a device that connects the vehicle platform 100 and the autonomous driving platform 200 to each other and relays information that is input and output between the vehicle platform 100 and the autonomous driving platform 200. Specifically, the vehicle control interface 300 is configured to include a controller that acquires a first control instruction including a plurality of commands with respect to the vehicle platform, converts the first control instruction into a second control instruction with respect to the first controller and the second controller, and transmits the second control instruction to the first controller and the second controller.

The first control instruction is generated as a general-purpose instruction not specific to the vehicle platform connected. The first control instruction is an instruction that the vehicle platform cannot interpret. The first control instruction includes the commands with respect to the vehicle platform. Although examples of the commands include a command with respect to an engine system, a command with respect to a powertrain system, a command with respect to a brake system, a command with respect to an electric system, and a command with respect to a body system, the commands are not limited thereto. In addition, a command may not be issued for each vehicle component. For example, the commands may be commands to accelerate or decelerate and may be commands to steer.

The controller of the vehicle control interface 300 converts the first control instruction into the second control instruction for the first controller and the second controller. The second control instruction is an instruction that the vehicle platform 100 can interpret. In the case of such a configuration, a general-purpose instruction can be converted into an instruction specific to a vehicle type or a maker.

The vehicle system is provided with a controlling device. The controlling device may be included in at least one of the first controller and the second controller of the vehicle platform 100 or in the controller of the vehicle control interface 300. The controlling device can switch the electric power mode of the vehicle to an electric power mode (wake mode) in which the second controller and the vehicle control interface enter an operating state and supply of electric power from a high-voltage electric power source to a drive unit is cut off.

Here, the vehicle platform 100 is provided with the high-voltage electric power source and a low-voltage electric power source. The high-voltage electric power source is an electric power source that can supply electric power to the drive unit. When there is electric power supplied from the high-voltage electric power source to the drive unit, the vehicle enters a state of being able to travel. Meanwhile, the drive unit is not operated by electric power supplied from the low-voltage electric power source. The first controller is a computer that performs control relating to traveling of the vehicle and controls the drive unit when there is electric power supplied from the high-voltage electric power source to the drive unit. Meanwhile, the low-voltage electric power source is an electric power source that supplies electric power to an auxiliary device not relating to the driving of the vehicle. Therefore, even when there is electric power supplied from the low-voltage electric power source, the vehicle cannot be driven when there is no electric power supplied from the high-voltage electric power source. The auxiliary device is, for example, a device not relating to the driving of the vehicle like a locking and unlocking device or an air conditioner and is a device that is operated by electric power supplied from the low-voltage electric power source. The second controller is a computer that performs control not relating to traveling of the vehicle and controls the auxiliary device. Note that, each of the first controller and the second controller may be one computer. In addition, each of the first controller and the second controller may be configured by using a plurality of computers.

In addition, in the wake mode, the second controller and the vehicle control interface 300 enter the operating state by means of supply of electric power from the low-voltage electric power source. Accordingly, a control instruction can be transmitted from the third controller of the autonomous driving platform 200 to the second controller. Note that, the first controller at this time may be in an operating state and may be in a stopped state. However, since supply of electric power from the high-voltage electric power source to the drive unit is cut off, even when a control instruction that causes the vehicle to travel is transmitted to the vehicle platform 100 from the autonomous driving platform 200, electric power cannot be supplied to the drive unit. Therefore, the vehicle cannot be caused to travel. That is, it is possible to operate the device (auxiliary device) not relating to traveling of the vehicle when the vehicle is in a state of being not able to travel. Note that, an operating state is a state where the function of a device can be exhibited. In addition, a stopped state which will be described later is a state where a system is stopped. The stopped state may be a state where no electric power is supplied to a computer or a device, a state where the minimum electric power needed for activation is supplied, or a state where the minimum electric power needed for maintaining a system is supplied.

The controlling device may switch between a sleep mode in which the first controller, the second controller, and the vehicle control interface enter a stopped state and supply of electric power from the high-voltage electric power source to the drive unit is cut off and the wake mode in which the second controller and the vehicle control interface enter an operating state and supply of electric power from the high-voltage electric power source to the drive unit is cut off. In addition, the controlling device may switch between the wake mode in which the second controller and the vehicle control interface enter an operating state and supply of electric power from the high-voltage electric power source to the drive unit is cut off and a driving mode in which the first controller, the second controller, and the vehicle control interface enter an operating state and electric power is supplied from the high-voltage electric power source to the drive unit.

The sleep mode is a mode in which supply of electric power from the high-voltage electric power source to the drive unit is cut off and thus the vehicle cannot be caused to travel. In addition, the sleep mode is a mode in which the second controller is also stopped and thus the auxiliary device also cannot be controlled. In the sleep mode, the first controller, the second controller, and the vehicle control interface enter a stopped state and thus electric power consumption amount can be reduced. The driving mode is a mode in which electric power is supplied from the high-voltage electric power source to the drive unit and the first controller is in an operating state so that the vehicle can be caused to travel. In addition, the driving mode is a mode in which the second controller is also operated and thus the auxiliary device can also be controlled. Since transition from the sleep mode to the driving mode is not made directly and the transition between the modes is made through the wake mode, it is possible to operate a device (auxiliary device) not relating to traveling of the vehicle when the vehicle is in a state of being not able to travel.

In addition, the controlling device may make a switch from the sleep mode to the wake mode in a case where a request for the switch from the sleep mode to the wake mode is input to the vehicle control interface from the third controller. That is, the vehicle platform 100 and the vehicle control interface 300 may be switched from the sleep mode to the wake mode by means of a control instruction from the autonomous driving platform 200.

In addition, the vehicle platform may be provided with a locking and unlocking device that locks and unlocks a door and the controlling device may make a switch from the sleep mode to the wake mode in a case where a request for an unlocking operation with respect to the locking and unlocking device is made by a user. The case where the request for the unlocking operation with respect to the locking and unlocking device is made by the user means a case where the user performs an operation of unlocking the door (for example, case where user tries to unlock door by using physical key) or a case where a signal requesting an unlocking operation is received from a portable terminal (for example, portable machine such as smart key) carried by the user. In such a case, the vehicle platform 100 and the vehicle control interface 300 may be switched from the sleep mode to the wake mode.

In addition, the controlling device may make a switch from the wake mode to the sleep mode in a case where a request for the switch from the wake mode to the sleep mode is input to the vehicle control interface from the third controller. That is, the vehicle platform 100 and the vehicle control interface 300 may be switched from the wake mode to the sleep mode by means of a control instruction from the autonomous driving platform 200.

In addition, the controlling device may make a switch from the wake mode to the driving mode in a case where a request for the switch from the wake mode to the driving mode is input to the vehicle control interface from the third controller. That is, the vehicle platform 100 and the vehicle control interface 300 may be switched from the wake mode to the driving mode by means of a control instruction from the autonomous driving platform 200.

In addition, the vehicle platform may be provided with a user interface that the user operates when the user makes a request for the switch from the wake mode to the driving mode and the controlling device may make the switch from the wake mode to the driving mode in a case where there is an inputting operation performed on the user interface in the wake mode. Typically, the user interface is a push button, a changeover switch, or a touch panel and is a device that the user can operate by himself or herself. The user operates the user interface when the user issues an instruction relating to the electric power mode of the vehicle. Note that, the user may be an occupant of the vehicle and may be an operator who operates the vehicle by remote control at the outside of the vehicle. The switch from the wake mode to the driving mode may be made when an operation is performed by such a user. In addition, a switch from the sleep mode to the driving mode may be made when an operation is performed by the user.

In addition, the controlling device may make a switch from the driving mode to the wake mode in a case where a request for the switch from the driving mode to the wake mode is input to the vehicle control interface from the third controller. That is, the vehicle platform 100 and the vehicle control interface 300 may be switched from the driving mode to the wake mode by means of a control instruction from the autonomous driving platform 200.

In addition, the vehicle platform may be provided with a user interface that the user operates when the user makes a request for the switch from the driving mode to the wake mode and the controlling device may make the switch from the driving mode to the wake mode in a case where there is an inputting operation performed on the user interface in the driving mode. That is, the switch from the driving mode to the wake mode may be made when an operation is performed by the user.

Embodiment

The outline of the vehicle system according to the embodiment will be described. As shown in FIG. 1, the vehicle system according to the present embodiment is configured to include the vehicle platform 100, the autonomous driving platform 200, and the vehicle control interface 300. The vehicle platform 100 is a vehicle platform in the related art. The vehicle platform 100 operates based on a control instruction specific to the vehicle and generates vehicle information specific to the vehicle. The control instruction or the vehicle information is encapsulated by means of CAN frames flowing in a vehicle-mounted network, for example.

The autonomous driving platform 200 includes means for sensing the vicinity of the vehicle and issues a control instruction not specific to a vehicle type or a maker. In addition, the autonomous driving platform 200 acquires vehicle information not specific to a vehicle type or a maker. The vehicle control interface 300 converts a control instruction (that is, control instruction that vehicle platform 100 can interpret) specific to the vehicle and a control instruction (that is, control instruction that is generated by autonomous driving platform 200 and that vehicle platform 100 cannot interpret) not specific to the vehicle into each other. In addition, the vehicle control interface 300 converts vehicle information (that is, vehicle information that is generated by vehicle platform 100) specific to the vehicle and vehicle information (that is, vehicle information that autonomous driving platform 200 can interpret) not specific to the vehicle into each other.

Figure 2:
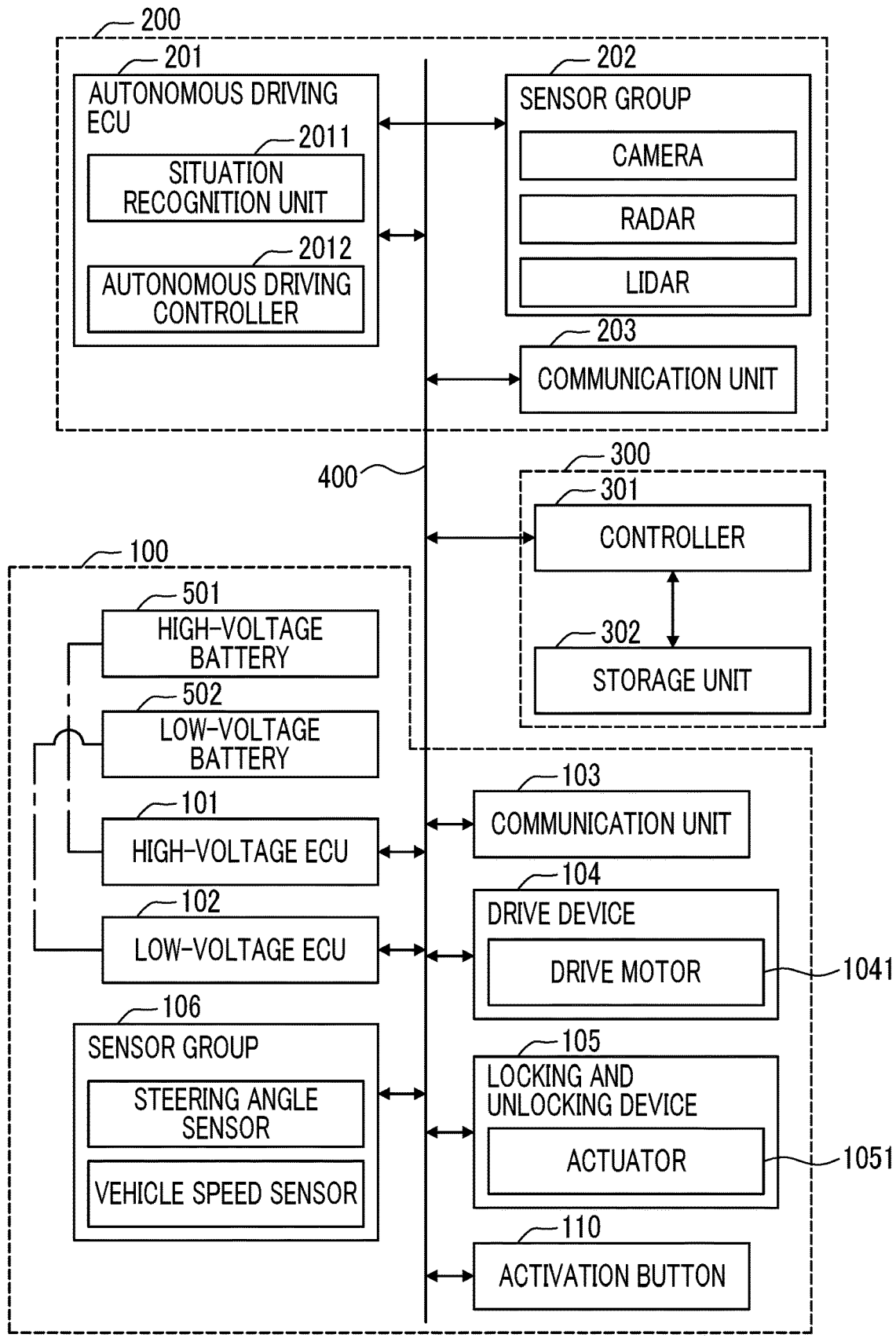
FIG. 2 is a block diagram schematically illustrating an example of the configuration of the vehicle system.

Next, constituent elements of the system will be described in detail. FIG. 2 is a block diagram schematically illustrating an example of the configuration of the vehicle system shown in FIG. 1. The vehicle system includes the vehicle platform 100, the autonomous driving platform 200, and the vehicle control interface 300 and each constituent element is communicatively connected by means of a bus 400.

The vehicle platform 100 is configured to include a high-voltage ECU 101, a low-voltage ECU 102, a communication unit 103, a drive device 104, a locking and unlocking device 105, a sensor group 106, an activation button 110, a high-voltage battery 501, and a low-voltage battery 502. Note that, although an electric vehicle including a drive motor 1041 is used as an example in the present example, a target vehicle may be a vehicle driven by means of an engine or a hybrid vehicle driven by means of an engine and a drive motor. Note that, in the vehicle platform 100, an ECU or a sensor other than those illustrated may be provided. The high-voltage ECU 101 is an example of the first controller. The low-voltage ECU 102 is an example of the second controller. The high-voltage battery 501 is an example of the high-voltage electric power source. The low-voltage battery 502 is an example of the low-voltage electric power source. The activation button 110 is an example of the user interface. The high-voltage ECU 101 and the low-voltage ECU 102 are configured by using, for example, central processing units (CPU).

The high-voltage ECU 101 is a computer that controls a device that operates when there is electric power supplied from the high-voltage battery 501 and does not operate when there is electric power supplied from the low-voltage battery 502 solely. Hereinafter, the device controlled by the high-voltage ECU 101 may be referred to as a "high-voltage device". The high-voltage device is, for example, a constituent element (for example, drive motor 1041 of drive device 104 which will be described later) of a driving system included in the vehicle. The high-voltage ECU 101 operates when there is electric power supplied from the high-voltage battery 501 and does not operate even when there is electric power supplied from the low-voltage battery 502. The high-voltage ECU 101 may be a combination of a plurality of computers.

In addition, in a case where the vehicle is an electric vehicle, the high-voltage ECU 101 can control the rotation rate of the drive motor 1041 by transmitting a signal for controlling the drive voltage, the drive current, the drive frequency, or the like of the drive motor 1041 of the drive device 104 (which will be described later) to the drive device 104. In this manner, the high-voltage ECU 101 can control the speed of the vehicle. In this case, it is possible to control the rotation rate of a motor based on a control instruction generated due to an operation performed by an occupant. In addition, it is possible to control a regenerative current based on a control instruction indicating a depressing force on a brake pedal or the degree of regenerative braking.

In addition, in a case where the vehicle is an engine vehicle, the high-voltage ECU 101 controls the starting of an engine by controlling a starter motor for starting the engine or controls the rotation rate of the engine by controlling the timing of the opening and closing of a fuel injection valve. The high-voltage ECU 101 can control the rotation rate of the engine based on a control instruction (for example, instruction designating throttle valve opening degree) generated due to an operation (operation on accelerator pedal or like) performed by an occupant, for example. Note that, in a case where the vehicle is a hybrid vehicle, both of control with respect to an engine and control with respect to the drive motor 1041 may be performed.

Meanwhile, the low-voltage ECU 102 is a computer that controls a device that operates when there is electric power supplied from the low-voltage battery 502. In addition, the low-voltage ECU 102 also operates when there is electric power supplied from the low-voltage battery 502. Hereinafter, the device controlled by the low-voltage ECU 102 may be referred to as a "low-voltage device". The low-voltage device is, for example, a constituent element (for example, actuator 1051 of locking and unlocking device 105 which will be described later) of a body system included in the vehicle. Although the low-voltage ECU 102 and the low-voltage device operate when there is electric power supplied from the low-voltage battery 502, the low-voltage ECU 102 and the low-voltage device may operate also when there is electric power supplied from the high-voltage battery 501 via a DC-to-DC converter 503, which will be described later. The low-voltage ECU 102 may be a combination of a plurality of computers.

The low-voltage ECU 102 can control the locking and unlocking of a door of the vehicle by controlling, for example, the actuator 1051 included in the locking and unlocking device 105 which will be described later. The low-voltage ECU 102 controls the locking and unlocking of the door of the vehicle by transmitting a signal for driving the actuator 1051 to the locking and unlocking device 105 based on an operation performed by an occupant, an instruction from the autonomous driving platform 200, a signal from a portable machine like a smart key, or the like.

The communication unit 103 is means for communicating with a center server or a terminal (examples thereof include portable machine like smart key) carried by the user via a network. The communication unit 103 is, for example, a local area network (LAN) interface board or a wireless communication circuit for wireless communication. The communication unit 103 performs data communication according to a predetermined wireless communication standard (for example, Bluetooth (registered trademark) low energy, near field communication (NFC), ultra wide band (UWB), and Wi-Fi (registered trademark).

The drive device 104 is a drive system that the vehicle includes. The drive device 104 is configured to include the drive motor 1041 or the like. The drive motor 1041 is means for driving the vehicle by rotating the wheels of the vehicle. With the drive motor 1041 driving the vehicle when receiving an instruction from the high-voltage ECU 101, the vehicle can be caused to travel. Note that, the drive device 104 may include a transmission or the like. The transmission may also be controlled by the high-voltage ECU 101.

The locking and unlocking device 105 is a device for locking and unlocking a door of the vehicle and is a device constituting a portion of a smart key system. The locking and unlocking device 105 is configured to include the actuator 1051 or the like that operates when a door is to be locked and unlocked. The locking and unlocking device 105 is operated by a control signal from the low-voltage ECU 102. For example, in a case where the low-voltage ECU 102 receives an unlocking signal for a door via the communication unit 103, the low-voltage ECU 102 transmits a control instruction to the locking and unlocking device 105 such that the actuator 1051 is operated and the door is unlocked.

The sensor group 106 is means for sensing a device included in the vehicle and is typically configured to include a steering angle sensor and a vehicle speed sensor. Information acquired by a sensor included in the sensor group 106 is transmitted to the high-voltage ECU 101 and the low-voltage ECU 102 as needed. The activation button 110 is a button for switching between an able-to-travel state and an unable-to-travel state and can be pressed by an occupant or by means of remote control. The remote control is performed via the communication unit 103.

The high-voltage battery 501 is a battery that supplies electric power to the high-voltage ECU 101, the high-voltage device, and the autonomous driving platform 200. Meanwhile, the low-voltage battery 502 is a battery of which the voltage at the time of supply of electric power is lower than that of the high-voltage battery 501. The low-voltage battery 502 is a battery that supplies electric power to the low-voltage ECU 102 and the low-voltage device. Note that, since supply of electric power to the autonomous driving platform 200 is controlled by the autonomous driving platform 200, description thereof will be omitted in the present embodiment.

Next, the autonomous driving platform 200 will be described. The autonomous driving platform 200 is a device that senses the vicinity of the vehicle, generates a plan about a traveling operation based on the result of a sensing operation, and issues an instruction with respect to the vehicle platform 100 according to the plan. The autonomous driving platform 200 may be developed by a maker or a vendor different from that of the vehicle platform 100. The autonomous driving platform 200 is configured to include an autonomous driving ECU 201, a sensor group 202, and a communication unit 203. The autonomous driving ECU 201 is an example of the third controller.

The autonomous driving ECU 201 is a computer that performs determination about autonomous driving based on data acquired from the sensor group 202, which will be described later, and communicates with the vehicle platform 100 via the vehicle control interface 300 to control the vehicle. The autonomous driving ECU 201 is configured by using, for example, a central processing unit (CPU). The autonomous driving ECU 201 is configured to include two functional modules, which are a situation recognition unit 2011 and an autonomous driving controller 2012. Each functional module may be realized with a CPU executing a program stored in storage means such as a read only memory (ROM).

The situation recognition unit 2011 detects a surrounding environment around the vehicle based on data acquired by a sensor included in the sensor group 202, which will be described later. Examples of a target to be detected include the number of lanes or the positions of lanes, the number of vehicles present in the vicinity of a host vehicle or the positions of the other vehicles, the number of obstacles (for example, pedestrian, bicycle, structure, and building) present in the vicinity of the host vehicle or the positions of the obstacles, the structure of a road, and a traffic sign. However, the target to be detected is not limited thereto. The target to be detected may be any type of target that needs to be detected for autonomous travel. Data about the environment detected by the situation recognition unit 2011 (hereinafter, referred to as environment data) is transmitted to the autonomous driving controller 2012, which will be described later.

The autonomous driving controller 2012 uses the environment data generated by the situation recognition unit 2011 to control traveling of the host vehicle. For example, the autonomous driving controller 2012 generates a traveling trajectory of the host vehicle based on the environment data and determines the degree of acceleration and deceleration and the steering angle of the vehicle such that the vehicle travels along the traveling trajectory. Information determined by the autonomous driving controller 2012 is transmitted to the vehicle platform 100 (high-voltage ECU 101 and low-voltage ECU 102) via the vehicle control interface 300 which will be described later. As a method of causing the vehicle to autonomously travel, a known method can be adopted.

In the present embodiment, the autonomous driving controller 2012 generates, for example, the following data as a first control instruction and transmits the data to the vehicle control interface 300.

(1) Data designating the degree of acceleration and deceleration (2) Data designating a steering angle (3) Data designating a shift range (4) A request for application and release of a parking brake (5) A request for a switch to an electric power mode The data designating the degree of acceleration and deceleration is data designating the amount of (positive or negative) change in vehicle speed per unit time. The data designating the steering angle is data designating the turning angle of steered wheels that the vehicle includes. Although the data is typically the turning angle of tires that are steered wheels, the data may be other than the turning angle as long as the data relates to the steering of the vehicle. For example, the data may be data indicating the angle of a steering wheel, a percentage with respect to the maximum turning angle, or the like. In addition, the data may be a scheduled trajectory of the vehicle. The data designating the shift range is data designating a shift position (for example, park, drive, reverse, neutral, or like). The request for application and release of the parking brake is data indicating whether or not to operate a mechanical or electrical parking brake.

The request for the switch to the electric power mode is data designating a plurality of electric power modes of the vehicle. The electric power modes are, for example, a "sleep mode (state where vehicle electric power source is cut off)", a "wake mode (state where electric power is supplied from low-voltage battery 502 solely)", and a "driving mode (state where electric power is supplied from high-voltage battery 501)". The details of the electric power modes will be described later. The first control instruction including the above-described data is a common instruction that does not depend on a vehicle type or a maker.

The sensor group 202 is means for sensing the vicinity of the vehicle, and is typically configured to include a monocular camera, a stereo camera, a radar, a LIDAR, a laser scanner, and the like. The sensor group 202 may include means (GPS module or like) for acquiring the current position of the vehicle in addition to means for sensing the vicinity of the vehicle. Information acquired by a sensor included in the sensor group 202 is transmitted to the autonomous driving ECU 201 (situation recognition unit 2011) as needed.

The communication unit 203 is means for communicating with the center server or the terminal carried by the user via a network. The communication unit 203 is, for example, a local area network (LAN) interface board or a wireless communication circuit for wireless communication. The LAN interface board or the wireless communication circuit is connected to the network.

Next, the vehicle control interface 300 will be described. The format of a control instruction handled by the high-voltage ECU 101 and the low-voltage ECU 102 in the present embodiment is specific to the vehicle or a maker. Meanwhile, the autonomous driving platform 200 is a device that is developed by a third party and is supposed to be installed in various types of vehicles of various makers. That is, connecting the vehicle platform 100 and the autonomous driving platform 200 to the same vehicle-mounted network is costly. Therefore, in the present embodiment, the vehicle control interface 300 is used as a device that converts and relays data exchanged between both of the high-voltage ECU 101 and the low-voltage ECU 102 and the autonomous driving ECU 201. The vehicle control interface 300 includes a controller 301 and a storage unit 302.

Figure 3:
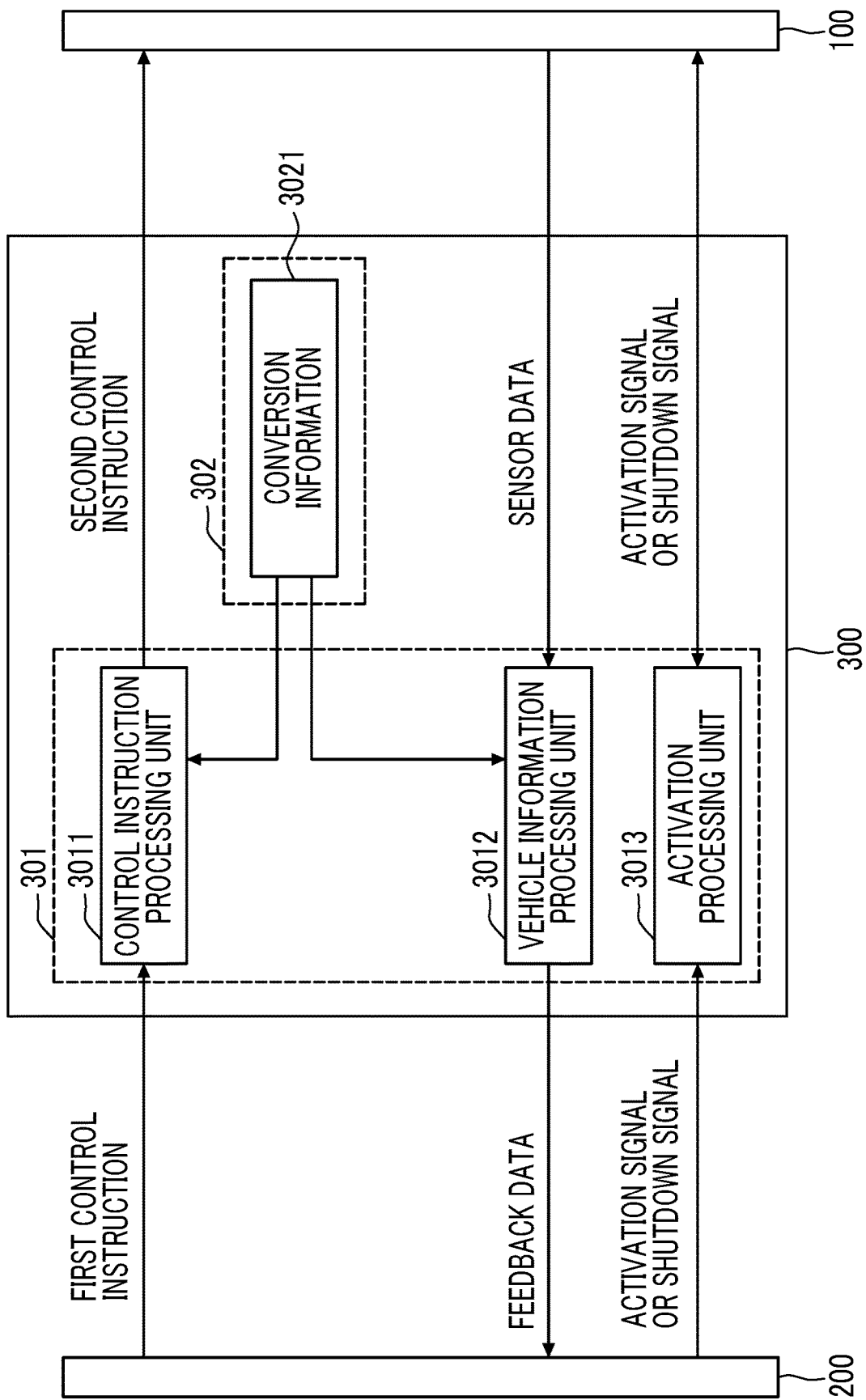
FIG. 3 is a diagram for describing data input and output by a vehicle control interface.

The controller 301 is a computer that converts a control instruction handled by the high-voltage ECU 101 and the low-voltage ECU 102 and a control instruction handled by the autonomous driving ECU 201 into each other. The controller 301 is configured by using, for example, a central processing unit (CPU). As shown in FIG. 3, the controller 301 is configured to include three functional modules which are a control instruction processing unit 3011, a vehicle information processing unit 3012, and an activation processing unit 3013. Each functional module may be realized with a CPU executing a program stored in the storage unit 302 which will be described later.

The control instruction processing unit 3011 receives a first control instruction from the autonomous driving ECU 201 and converts the first control instruction into data (second control instruction) that the high-voltage ECU 101 and the low-voltage ECU 102 can interpret. For example, in a case where the first control instruction includes data designating an electric power mode, the designated electric power mode is converted into data denoting the electric power mode that the high-voltage ECU 101 and the low-voltage ECU 102 can interpret. In addition, for example, in a case where the first control instruction includes data designating the degree of acceleration and deceleration, the designated degree of acceleration and deceleration (for example, +3.0 km/h/s) is converted into data denoting a throttle valve opening degree or data designating a brake pressure. The second control instruction obtained through the conversion is transmitted in a protocol or format specific to the vehicle platform 100. In addition, for example, in a case where the first control instruction includes data designating a steering angle, the designated steering angle (for example, 10 degrees to right) is converted into data denoting the steering angle that the high-voltage ECU 101 can interpret. A conversion process is performed by means of conversion information 3021 stored in the storage unit 302 which will be described later.

The vehicle information processing unit 3012 receives information about the state of the vehicle from the high-voltage ECU 101 and the low-voltage ECU 102 and converts the information into information (information not specific to vehicle type) that the autonomous driving ECU 201 can interpret. Specifically, the vehicle information processing unit 3012 converts information transmitted in a protocol or format specific to the vehicle platform 100 into information (hereinafter, referred to as feedback data) of a common format. Hereinafter, the information about the state of the vehicle will be referred to as sensor data. The sensor data is data based on information acquired by a steering angle sensor 111 or a vehicle speed sensor 112 and is transmitted to the vehicle-mounted network by the high-voltage ECU 101 and the low-voltage ECU 102, for example. The sensor data is data of a format specific to the vehicle platform. The sensor data may be any data such as vehicle speed information, information about the turning angle of tires, information about the steering angle as long as feedback can be given to the autonomous driving ECU 201, for example.

The activation processing unit 3013 performs a process of activating and stopping (shutting down) the vehicle control interface 300 based on a signal from the autonomous driving ECU 201, the high-voltage ECU 101, and the low-voltage ECU 102. For example, in a case where the activation processing unit 3013 receives a signal (hereinafter, may be referred to as activation signal) for activation of the vehicle control interface 300, the activation processing unit 3013 activates the entire system of the vehicle control interface 300 such that the entire system of the vehicle control interface 300 including the control instruction processing unit 3011, the vehicle information processing unit 3012, and the storage unit 302 can be operated. At this time, electric power is supplied from the low-voltage battery 502. Accordingly, it becomes possible to convert a first control instruction into a second control instruction and to convert sensor data into feedback data. The activation signal may be transmitted from any of the autonomous driving platform 200 and the vehicle platform 100. In addition, the activation signal may be transmitted from the autonomous driving platform 200, as the first control instruction.

In addition, in the present embodiment, when any one of computers that can be activated by means of the low-voltage battery 502 is activated, the computer activates all of the other computers that can be activated by means of the low-voltage battery 502. Therefore, in a case where the low-voltage ECU 102 is activated, an activation signal is transmitted from the low-voltage ECU 102 to the activation processing unit 3013. In addition, when the activation processing unit 3013 receives an activation signal, the activation processing unit 3013 transmits the activation signal to the low-voltage ECU 102 such that the low-voltage ECU 102 of the vehicle platform 100 is activated. Note that, there may be a case where the activation signal received by the activation processing unit 3013 is sent from the low-voltage ECU 102. However, the activation processing unit 3013 does not need to grasp which of the autonomous driving platform 200 and the vehicle platform 100 has sent the activation signal. The low-voltage ECU 102 ignores an activation signal in a case where the low-voltage ECU 102 receives the activation signal when the low-voltage ECU in an activated state already.

In addition, for example, in a case where the activation processing unit 3013 receives a signal (hereinafter, may be referred to as shutdown signal) for shutdown of the vehicle control interface 300, the activation processing unit 3013 shuts down the entire system of the vehicle control interface 300. In addition, when the activation processing unit 3013 receives the shutdown signal, the activation processing unit 3013 transmits the shutdown signal to the high-voltage ECU 101 and the low-voltage ECU 102 such that the high-voltage ECU 101 and the low-voltage ECU 102 are stopped. The shutdown signal is sent by the autonomous driving ECU 201 of the autonomous driving platform 200.

The storage unit 302 is means for storing information and is configured by using a storage medium such as a RAM, a magnetic disk, and a flash memory. The storage unit 302 stores information (hereinafter, referred to as conversion information 3021) for converting a first control instruction generated by the autonomous driving ECU 201 (autonomous driving controller 2012) and a second control instruction that the high-voltage ECU 101 and the low-voltage ECU 102 can interpret, into each other. Furthermore, the conversion information 3021 includes information for converting sensor data specific to the vehicle into feedback data.

The conversion information 3021 includes, for example, the configuration of data input or output with respect to the high-voltage ECU 101, the parameter thereof, and a table or a formula for converting an input value into a parameter. In addition, the conversion information 3021 includes the configuration of the sensor data output from the high-voltage ECU 101, the parameter thereof, a table or a formula for converting a parameter into a physical value, and the like.

Figure 4:
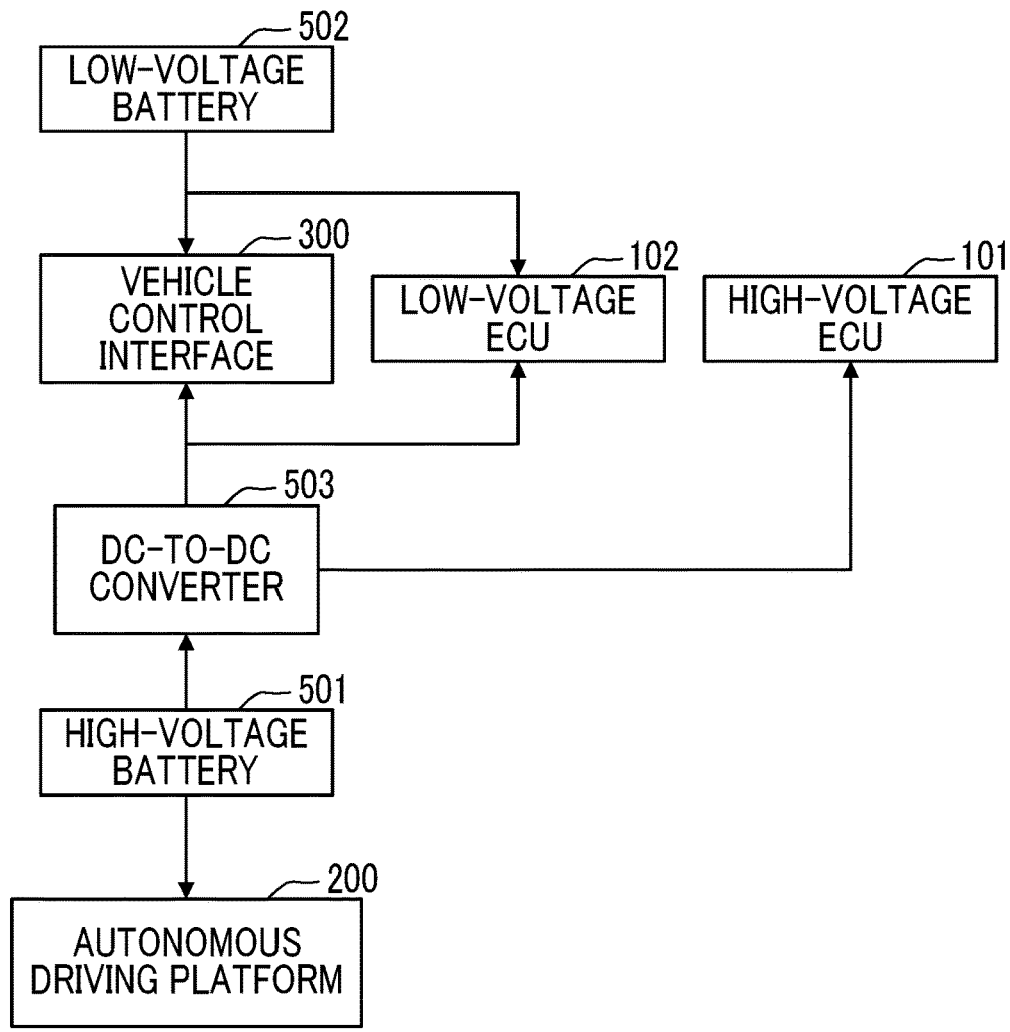
FIG. 4 is a block diagram for describing supply of electric power.

FIG. 4 is a block diagram for describing supply of electric power. The vehicle control interface 300 and the low-voltage ECU 102 can be activated when there is electric power supplied from the low-voltage battery 502. Note that, although the vehicle control interface 300 and the low-voltage ECU 102 can receive electric power supplied from the high-voltage battery 501 via the DC-to-DC converter 503, the vehicle control interface 300 and the low-voltage ECU 102 do not need to receive electric power supplied from the high-voltage battery 501. In addition, the high-voltage ECU 101 can be activated when there is electric power supplied from the high-voltage battery 501 via the DC-to-DC converter 503. Activation and stoppage of the DC-to-DC converter 503 are controlled by the low-voltage ECU 102. In addition, the high-voltage battery 501 supplies electric power to the autonomous driving platform 200. Note that, the low-voltage battery 502 may also supply electric power to the autonomous driving platform 200.

Figure 5:
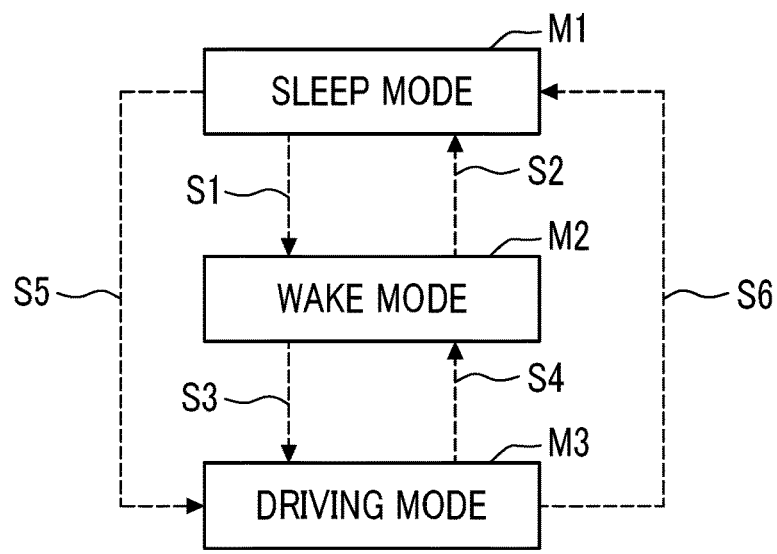
FIG. 5 is a diagram for describing electric power modes of the vehicle.

FIG. 5 is a diagram for describing the electric power modes of the vehicle. The electric power modes include a sleep mode M1, a wake mode M2, and a driving mode M3 and transition can be made from each mode to another mode. The electric power modes are switched by the high-voltage ECU 101, the low-voltage ECU 102, and the autonomous driving ECU 201. Note that, the high-voltage ECU 101 or the low-voltage ECU 102 may switch the electric power modes when the autonomous driving platform 200 requests the vehicle platform 100 to switch the electric power modes. The electric power modes shown in FIG. 5 correspond to the vehicle platform 100 and the vehicle control interface 300 and the electric power modes of the autonomous driving platform 200 are set separately. In the present embodiment, the electric power modes of the autonomous driving platform 200 will not be described.

In the sleep mode M1, the high-voltage ECU 101 and the low-voltage ECU 102 of the vehicle platform 100 are in a stopped state. In addition, the DC-to-DC converter 503 is in a stopped state and supply of electric power from the high-voltage battery 501 to each device is also stopped. In addition, in the sleep mode M1, the vehicle control interface 300 is also in a stopped state.

In the wake mode M2, as with the sleep mode M1, the DC-to-DC converter 503 is in a stopped state and the high-voltage ECU 101 is in a stopped state. Since the DC-to-DC converter 503 is in the stopped state, supply of electric power from the high-voltage battery 501 to each device is cut off. Note that, although supply of electric power from the high-voltage battery 501 is cut off with the DC-to-DC converter 503 entering the stopped state in the present embodiment, the DC-to-DC converter 503 does not need to be provided. For example, supply of electric power from the high-voltage battery 501 to each device may be controlled by a relay. The relay is controlled by the low-voltage ECU 102.

In addition, in the wake mode M2, the low-voltage ECU 102 and the vehicle control interface 300 are in an operating state. In the wake mode M2, since the high-voltage ECU 101 is in a stopped state and thus the vehicle cannot be caused to travel. Meanwhile, since the low-voltage ECU 102 and the vehicle control interface 300 are in the operating state, devices that operate when there is electric power supplied from the low-voltage battery 502 can be operated. Since the vehicle control interface 300 is in the operating state, a state where the vehicle control interface 300 can convert a first control instruction sent from the autonomous driving platform 200 into a second control instruction and transmit the second control instruction to the vehicle platform 100 is achieved. Therefore, in the wake mode M2, for example, a locking and unlocking operation can be performed by the locking and unlocking device 105. In addition, the operating of the air conditioner, temperature adjustment, the opening and closing of a door, or the like also can be performed in the wake mode M2. The above-described devices can be controlled by the low-voltage ECU 102 based on a first control instruction issued from the autonomous driving platform 200 and can be controlled by the low-voltage ECU 102 with the low-voltage ECU 102 receiving an instruction from an occupant via an interface provided in the vehicle platform 100.

In the driving mode M3, the DC-to-DC converter 503 is in an operating state and electric power is supplied from the high-voltage battery 501 and the low-voltage battery 502 to the entire systems of the vehicle platform 100 and the vehicle control interface 300. At this time, control devices in the vehicle including the high-voltage ECU 101, the low-voltage ECU 102, and the controller 301 are in an operating state.

S1 in FIG. 5 represents transition from the sleep mode M1 to the wake mode M2. For example, S1 occurs in a case where an electric power mode request for a switch to the wake mode M2 is received by the vehicle control interface 300 when the electric power mode is the sleep mode M1 or in a case where a signal (unlocking signal) for unlocking a door is received from the portable machine of the user when the electric power mode is the sleep mode M1. Hereinafter, the electric power mode request for a switch to the wake mode M2 may be referred to as a wake request. The wake request corresponds to the activation signal as described above. An electric power mode request is a control instruction for a switch between the electric power modes, which is sent from the low-voltage ECU 102 of the vehicle platform 100 or the autonomous driving ECU 201 of the autonomous driving platform 200. For example, when the autonomous driving controller 2012 of the autonomous driving platform 200 receives a signal instructing that the vehicle be moved from the center server or the terminal carried by the user via the communication unit 203, the autonomous driving controller 2012 of the autonomous driving platform 200 generates a wake request and transmits the wake request to the vehicle control interface 300. When the activation processing unit 3013 receives the signal, the vehicle control interface 300 is activated by the activation processing unit 3013. In addition, the activation processing unit 3013 transmits the wake request to the vehicle platform 100. When the low-voltage ECU 102 receives the wake request, the low-voltage ECU 102 is activated.

In addition, when an unlocking signal is input from a smart key or the like via the communication unit 103, the low-voltage ECU 102 is activated. The low-voltage ECU 102 generates a wake request and transmits the wake request to the activation processing unit 3013 of the vehicle control interface and the activation processing unit 3013 receiving the wake request activates the vehicle control interface 300. Accordingly, the electric power mode transitions to the wake mode. In addition, the low-voltage ECU 102 receiving the unlocking signal transmits a signal such that the actuator 1051 of the locking and unlocking device 105 performs an unlocking operation.

S2 in FIG. 5 represents transition from the wake mode M2 to the sleep mode M1. For example, S2 occurs in a case where an electric power mode request for a switch to the sleep mode M1 is received by the vehicle control interface 300 when the electric power mode is the wake mode M2. Hereinafter, the electric power mode request for a switch to the sleep mode M1 may be referred to as a sleep request. The sleep request corresponds to the shutdown signal as described above. For example, in a case where traveling of the vehicle in accordance with an operation instruction is finished, the autonomous driving controller 2012 of the autonomous driving platform 200 generates a sleep request for shutdown of the vehicle and transmits the sleep request to the vehicle control interface 300. The activation processing unit 3013 of the vehicle control interface 300 receiving the sleep request transmits the sleep request to the vehicle platform 100. Accordingly, the low-voltage ECU 102 of the vehicle platform 100 is shut down. In addition, the activation processing unit 3013 shuts down the vehicle control interface 300.

S3 in FIG. 5 represents transition from the wake mode M2 to the driving mode M3. For example, S3 occurs in a case where an electric power mode request for a switch to the driving mode M3 is received by the vehicle control interface 300 when the electric power mode is the wake mode M2 or in a case where the activation button 110 is pressed by an occupant or the like when the electric power mode is the wake mode M2. Hereinafter, the electric power mode request for a switch to the driving mode M3 may be referred to as a driving request. In a case where the activation button 110 is pressed when the electric power mode is the wake mode M2, the low-voltage ECU 102 transmits a signal for activation of the DC-to-DC converter 503 to the DC-to-DC converter 503, generates a driving request, and transmits the driving request to the high-voltage ECU 101. When the high-voltage ECU 101 receives the driving request, the high-voltage ECU 101 is activated. In addition, in a case where a driving request is issued from the autonomous driving platform 200 as a first control instruction when the electric power mode is the wake mode M2, the driving request is converted into a second control instruction by the vehicle control interface 300 and the second control instruction is transmitted to the low-voltage ECU 102. The low-voltage ECU 102 receiving the second control instruction transmits a signal for activation of the DC-to-DC converter 503 to the DC-to-DC converter 503, generates a driving request, and transmits the driving request to the high-voltage ECU 101. When the high-voltage ECU 101 receives the driving request, the high-voltage ECU 101 is activated.

Note that, it is possible to set other conditions for transition from the wake mode M2 to the driving mode M3 that is made in response to a driving request from the autonomous driving platform 200. For example, when authentication of the autonomous driving platform 200 is not successful, the driving request from the autonomous driving platform 200 may be ignored. An authentication process for the autonomous driving platform 200 is performed by the low-voltage ECU 102 of the vehicle platform 100 when transition from the sleep mode M1 to the wake mode M2 is made, for example. For example, the low-voltage ECU 102 performs authentication of the autonomous driving platform 200 based on authentication information included in a first control instruction transmitted from the autonomous driving platform 200. Specifically, the low-voltage ECU 102 compares authentication information stored in storage means included in the vehicle platform 100 with and the authentication information transmitted from the autonomous driving platform 200 and determines that the authentication is successful in a case where the authentication information items coincide with each other. In a case where the authentication information items do not coincide with each other, the low-voltage ECU 102 determines that the authentication is not successful. Note that, the way in which the low-voltage ECU 102 performs the authentication may be a way of simply comparing the authentication information items with each other to test the sameness therebetween and may be a way of using asymmetric cryptography. In the vehicle platform 100, a second control instruction that is received before the authentication succeeds is ignored, for example.

Therefore, until the authentication process performed by the low-voltage ECU 102 is finished, it is not possible to cause the vehicle to travel by means of the autonomous driving platform 200. Furthermore, for example, the vehicle may be restrained from traveling when an occupant is not authenticated as a regular occupant. For example, authentication of the occupant may be performed through short-range communication between a terminal carried by the occupant and the vehicle platform 100. In addition, other conditions (for example, condition that seat belt is fastened by occupant, condition that door is closed, and condition that door is locked) may be added to conditions for transition to the driving mode M3.

S4 in FIG. 5 represents transition from the driving mode M3 to the wake mode M2. S4 occurs in a case where an electric power mode request (wake request) for a switch to the wake mode M2 is received when the electric power mode is the driving mode M3 or in a case where the activation button 110 is pushed by an occupant or the like when the electric power mode is the driving mode M3. In a case where the activation button 110 is pressed when the electric power mode is the driving mode M3, the low-voltage ECU 102 generates a wake request and transmits the wake request to the high-voltage ECU 101 and the high-voltage ECU 101 receiving the wake request is shut down. In addition, when the autonomous driving platform 200 transmits a wake request to the vehicle control interface 300 as a first control instruction when the electric power mode is the driving mode M3, the wake request is transmitted to the high-voltage ECU 101 and the low-voltage ECU 102 as a second control instruction. The high-voltage ECU 101 receiving the second control instruction is shut down. In addition, at the time of transition from the driving mode M3 to the wake mode M2, the low-voltage ECU 102 generates a signal for stoppage of the DC-to-DC converter 503 and transmits the signal to the DC-to-DC converter 503. When the DC-to-DC converter 503 receives the signal and the DC-to-DC converter 503 is stopped, supply of electric power from the high-voltage battery 501 is stopped.

S5 in FIG. 5 represents transition from the sleep mode M1 to the driving mode M3. S5 occurs in a case where the activation button 110 is pressed by an occupant or the like when the electric power mode is the sleep mode M1, for example. Note that, when the electric power mode is the sleep mode M1, authentication of the autonomous driving platform 200 has not been performed yet and thus the autonomous driving platform 200 cannot issue an instruction to transition from the sleep mode M1 to the driving mode M3 directly (even when autonomous driving platform 200 issues such instruction, vehicle platform 100 ignores instruction). In a case where the activation button 110 is pressed when the electric power mode is the sleep mode M1, the high-voltage ECU 101 and the low-voltage ECU 102 are activated. In this case, the low-voltage ECU 102 is activated first and then the low-voltage ECU 102 transmits a signal for activation of the DC-to-DC converter 503 to the DC-to-DC converter 503. Then, the low-voltage ECU 102 activates the high-voltage ECU 101 after the DC-to-DC converter 503 is activated. In addition, the low-voltage ECU 102 transmits an activation signal to the vehicle control interface 300. When the activation processing unit 3013 receives the signal, the vehicle control interface 300 is activated by the activation processing unit 3013. At the time of transition from the sleep mode M1 to the driving mode M3 also, the low-voltage ECU 102 may defer activation of the DC-to-DC converter 503 until authentication of the autonomous driving platform 200 succeeds.

S6 in FIG. 5 represents transition from the driving mode M3 to the sleep mode M1. S6 occurs in a case where an electric power mode request (sleep request) for a switch to the sleep mode M1 is received when the electric power mode is the driving mode M3, for example. For example, in a case where the vehicle arrives at a vehicle base and is stopped, the autonomous driving platform 200 generates a sleep request and transmits the sleep request to the vehicle control interface 300 as a first control instruction. The vehicle control interface 300 converts the sleep request into a second control instruction and transmits the second control instruction to the high-voltage ECU 101 and the low-voltage ECU 102 of the vehicle platform 100. The high-voltage ECU 101 and the low-voltage ECU 102 receiving the second control instruction are shut down. At this time, the low-voltage ECU 102 stops supply of electric power from the high-voltage battery 501 by stopping the DC-to-DC converter 503 as described above. Note that, the low-voltage ECU 102 may shut down itself after the low-voltage ECU 102 and the DC-to-DC converter 503 are shut down by the high-voltage ECU 101. In addition, when the sleep request is received by the activation processing unit 3013 in the vehicle control interface 300, the vehicle control interface 300 is shut down by the activation processing unit 3013.

Figure 6:
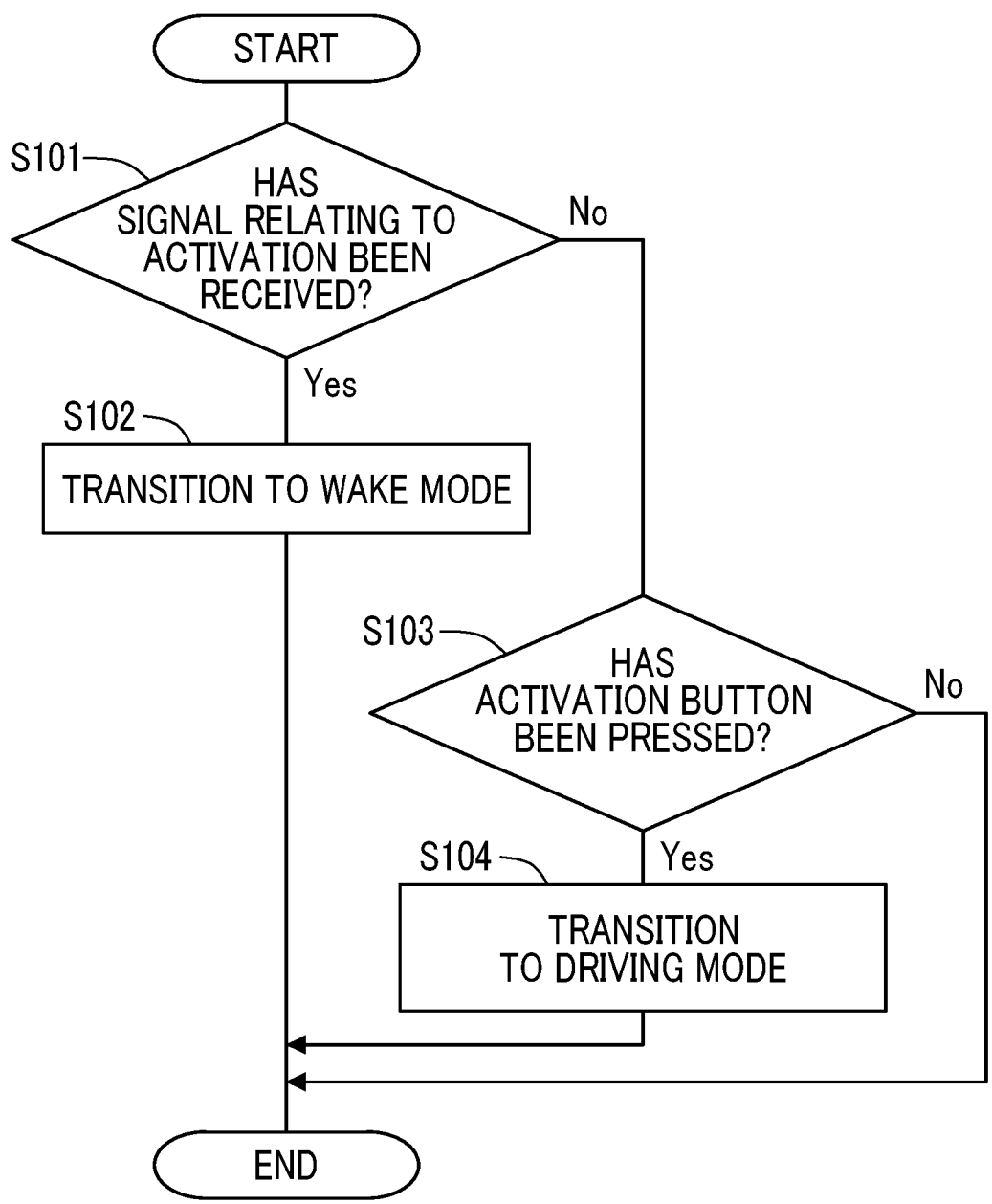
FIG. 6 is a flowchart showing the flow of control that is performed in a vehicle platform when an electric power mode is a sleep mode.

FIG. 6 is a flowchart showing the flow of control that is performed in the vehicle platform 100 when the electric power mode is the sleep mode M1. Processing as in the present flowchart is repeatedly performed by the low-voltage ECU 102 for each time a predetermined time elapses when the electric power mode is the sleep mode M1. In step S101, the low-voltage ECU 102 determines whether or not a signal relating to activation has been received. The signal relating to activation is a wake request transmitted from the activation processing unit 3013 or an unlocking signal transmitted from the portable machine of the user. In a case where the result of the determination in step S101 is positive, the process proceeds to step S102 and in a case where the result of the determination in step S101 is negative, the process proceeds to step S103.

In step S102, the low-voltage ECU 102 is activated and the electric power mode transitions to the wake mode M2. Thereafter, the low-voltage ECU 102 performs authentication of the autonomous driving platform 200 separately.

Meanwhile, in step S103, the low-voltage ECU 102 determines whether or not the activation button 110 has been pressed by an occupant or the like. In a case where the activation button 110 is pressed, a predetermined signal is input to the low-voltage ECU 102. The low-voltage ECU 102 determines whether or not such the signal has been input. In a case where the result of the determination in step S103 is positive, the process proceeds to step S104, the low-voltage ECU 102 is activated, and the electric power mode transitions to the driving mode M3.

In step S104, the low-voltage ECU 102 transmits an activation signal to the vehicle control interface 300. In addition, the low-voltage ECU 102 activates the DC-to-DC converter 503 and the high-voltage ECU 101 to achieve a state where electric power can be supplied from the high-voltage battery 501. When the vehicle control interface 300 is activated, the low-voltage ECU 102 performs authentication of the autonomous driving platform 200 separately. Meanwhile, in a case where the result of the determination in step S103 is negative, the low-voltage ECU 102 terminates the present routine with the electric power mode maintained at the sleep mode M1.

Figure 7:
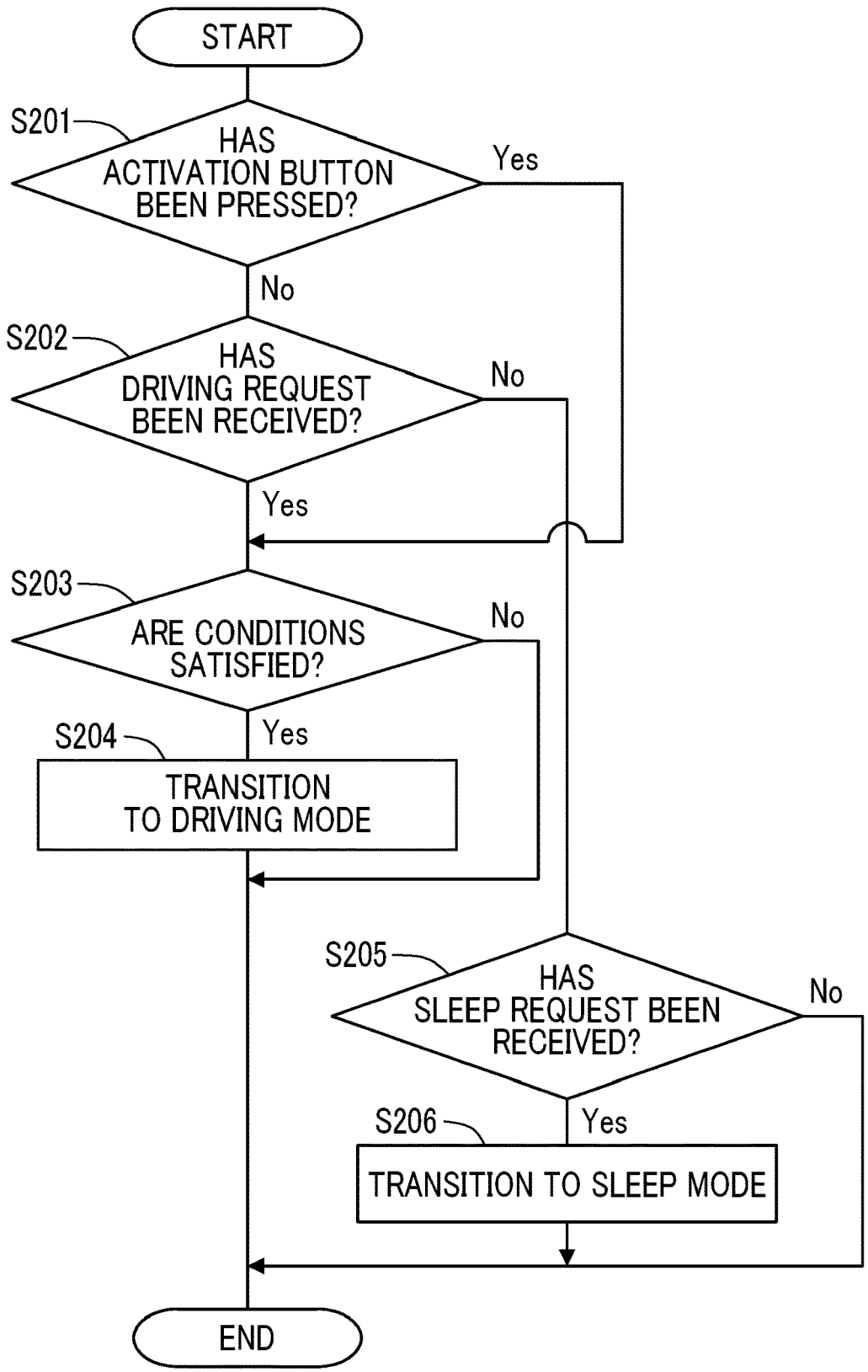
FIG. 7 is a flowchart showing the flow of control that is performed in the vehicle platform when the electric power mode is a wake mode.

FIG. 7 is a flowchart showing the flow of control that is performed in the vehicle platform 100 when the electric power mode is the wake mode M2. Processing as in the present flowchart is repeatedly performed by the low-voltage ECU 102 for each time a predetermined time elapses when the electric power mode is the wake mode M2. Note that, it will be assumed that the autonomous driving platform 200 has been successfully authenticated.

In step S201, the low-voltage ECU 102 determines whether or not the activation button 110 has been pressed. In a case where the result of the determination in step S201 is positive, the process proceeds to step S203 and in a case where the result of the determination in step S201 is negative, the process proceeds to step S202.

In step S202, the low-voltage ECU 102 determines whether or not a driving request has been received. The driving request is sent from the autonomous driving platform 200 as a first control instruction and is transmitted from the vehicle control interface 300 to the low-voltage ECU 102 after being converted into a second control instruction by the vehicle control interface 300. In a case where the result of the determination in step S202 is positive, the process proceeds to step S203 and in a case where the result of the determination in step S202 is negative, the process proceeds to step S205.

In step S203, the low-voltage ECU 102 determines whether or not conditions for the electric power mode to transition to the driving mode M3 are satisfied. Since the autonomous driving platform 200 has been successfully authenticated already, in step S203, determination is made on whether or not other conditions for the vehicle to travel (for example, whether or not door is locked) are satisfied. In a case where the result of the determination in step S203 is positive, the process proceeds to step S204. Meanwhile, in a case where the result of the determination in step S203 is negative, the present routine is terminated with the wake mode M2 being maintained.

In step S204, the low-voltage ECU 102 causes the electric power mode to transition to the driving mode M3. The low-voltage ECU 102 generates signals for activation of the DC-to-DC converter 503 and the high-voltage ECU 101 and transmits the signals thereto. Due to the signals, the DC-to-DC converter 503 and the high-voltage ECU 101 are activated. Since the vehicle control interface 300 has been activated already at this time, with the high-voltage ECU 101 activated, the autonomous driving platform 200 can cause the vehicle to travel by transmitting a control instruction to the vehicle platform 100 via the vehicle control interface 300.

Meanwhile, in step S205, the low-voltage ECU 102 determines whether or not a sleep request has been received. The sleep request is sent from the autonomous driving platform 200 as a first control instruction and is transmitted from the vehicle control interface 300 to the low-voltage ECU 102 after being converted into a second control instruction by the vehicle control interface 300. In a case where the result of the determination in step S205 is positive, the process proceeds to step S206 and in a case where the result of the determination in step S205 is negative, the present routine is terminated with the wake mode M2 being maintained.

In step S206, the low-voltage ECU 102 causes the electric power mode to transition to the sleep mode M1. The low-voltage ECU 102 transmits a shutdown signal to the vehicle control interface 300 such that the vehicle control interface 300 is shut down. In addition, the low-voltage ECU 102 shuts down itself so that the vehicle platform 100 is shut down.

Figure 8:
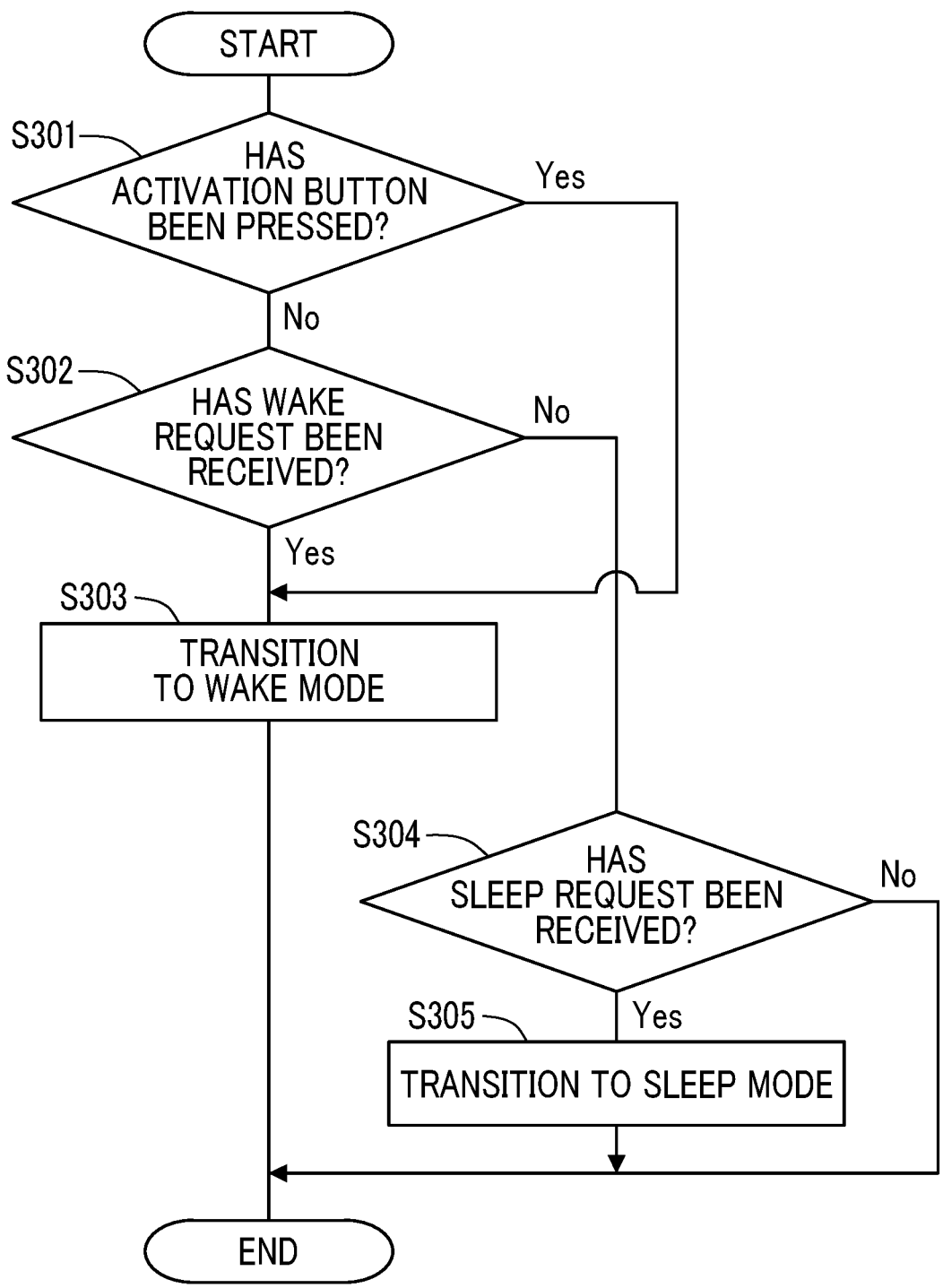
FIG. 8 is a flowchart showing the flow of control that is performed in the vehicle platform when the electric power mode is a driving mode.

FIG. 8 is a flowchart showing the flow of control that is performed in the vehicle platform 100 when the electric power mode is the driving mode M3. Processing as in the present flowchart is repeatedly performed by the low-voltage ECU 102 for each time a predetermined time elapses when the electric power mode is the driving mode M3. Note that, it will be assumed that a routine in FIG. 8 is performed when the vehicle speed is zero.

In step S301, the low-voltage ECU 102 determines whether or not the activation button 110 has been pressed. In a case where the activation button 110 is pressed by the occupant or the like when the electric power mode is the driving mode M3, the electric power mode transitions from the driving mode M3 to the wake mode M2. In a case where the result of the determination in step S301 is positive, the process proceeds to step S303 and in a case where the result of the determination in step S301 is negative, the process proceeds to step S302.

In step S302, the low-voltage ECU 102 determines whether or not a wake request has been received. The wake request is sent from the autonomous driving platform 200 as a first control instruction and is transmitted from the vehicle control interface 300 to the low-voltage ECU 102 after being converted into a second control instruction by the vehicle control interface 300. In a case where the result of the determination in step S302 is positive, the process proceeds to step S303 and in a case where the result of the determination in step S302 is negative, the process proceeds to step S304.

In step S303, the low-voltage ECU 102 causes the electric power mode to transition to the wake mode M2. The low-voltage ECU 102 generates a shutdown signal and transmits the shutdown signal to the high-voltage ECU 101. The high-voltage ECU 101 receiving the signal is shut down. In addition, the low-voltage ECU 102 generates a signal for shutdown of the DC-to-DC converter 503 and transmits the signal to the DC-to-DC converter 503. The DC-to-DC converter 503 receiving the signal is shut down. In this manner, the high-voltage ECU 101 and the DC-to-DC converter 503 are stopped sequentially.

Meanwhile, in step S304, the low-voltage ECU 102 determines whether or not a sleep request has been received. The sleep request is sent from the autonomous driving platform 200 as a first control instruction and is transmitted from the vehicle control interface 300 to the low-voltage ECU 102 after being converted into a second control instruction by the vehicle control interface 300. In a case where the result of the determination in step S304 is positive, the process proceeds to step S305 and in a case where the result of the determination in step S304 is negative, the present routine is terminated with the driving mode M3 being maintained.

In step S305, the low-voltage ECU 102 causes the electric power mode to transition to the sleep mode M1. The low-voltage ECU 102 generates a shutdown signal and transmits the shutdown signal to the vehicle control interface 300. The activation processing unit 3013 receiving the shutdown signal shuts down the vehicle control interface 300. In addition, the low-voltage ECU 102 shuts down the vehicle platform 100 by shutting down the high-voltage ECU 101, the DC-to-DC converter 503, and the low-voltage ECU 102 sequentially.

Figure 9:
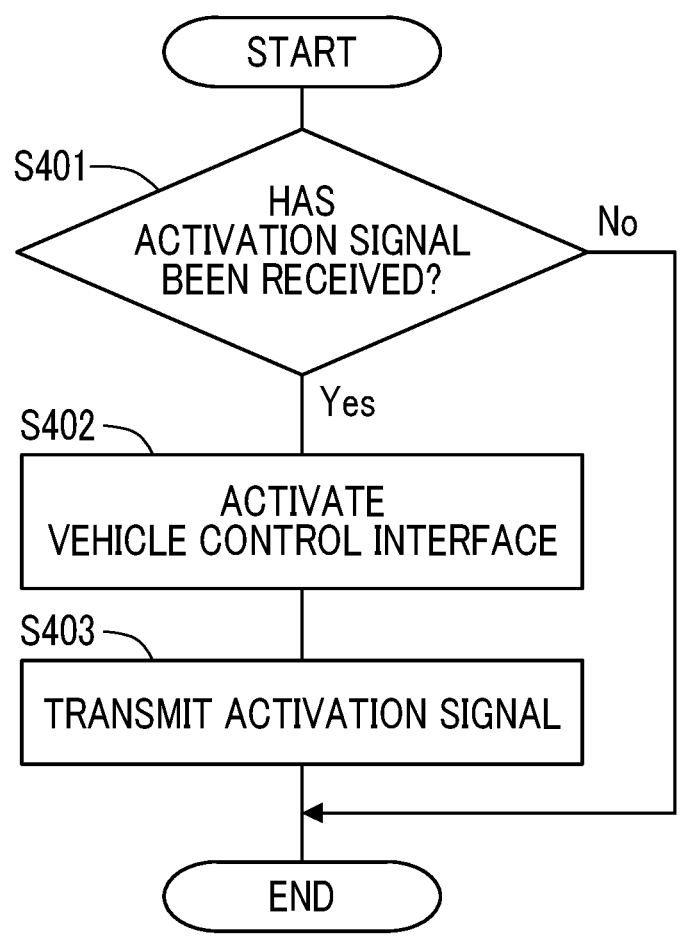
FIG. 9 is a flowchart showing the flow of control that is performed in the vehicle control interface when the electric power mode is the sleep mode.

FIG. 9 is a flowchart showing the flow of control that is performed in the vehicle control interface 300 when the electric power mode is the sleep mode M1. Processing as in the present flowchart is repeatedly performed by the activation processing unit 3013 for each time a predetermined time elapses when the electric power mode is the sleep mode M1. In step S401, the activation processing unit 3013 determines whether or not an activation signal has been received. The activation signal is sent from the low-voltage ECU 102 of the vehicle platform 100 or the autonomous driving ECU 201 of the autonomous driving platform 200. In a case where the result of the determination in step S401 is positive, the process proceeds to step S402 and in a case where the result of the determination in step S401 is negative, the present routine is terminated with the electric power mode maintained at the sleep mode M1.

In step S402, the activation processing unit 3013 activates the entire system of the vehicle control interface 300. Next, in step S403, the activation processing unit 3013 transmits the activation signal to the low-voltage ECU 102. In a case where the low-voltage ECU 102 has not been activated yet, the low-voltage ECU 102 is activated when the low-voltage ECU 102 receives the activation signal.

Figure 10:
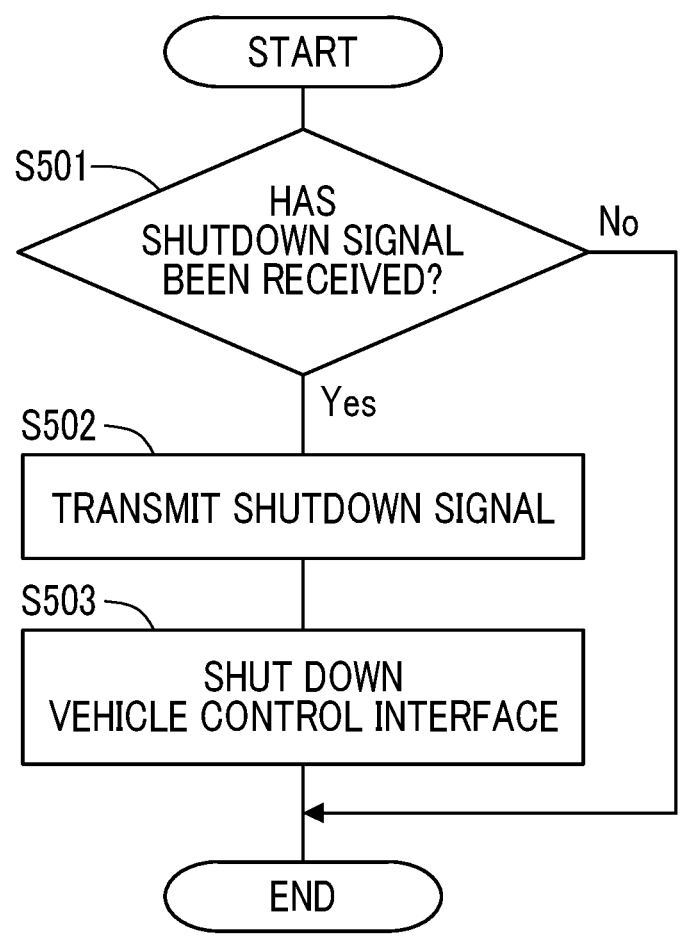
FIG. 10 is a flowchart showing the flow of control that is performed in the vehicle control interface when the electric power mode is the wake mode or the driving mode.

FIG. 10 is a flowchart showing the flow of control that is performed in the vehicle control interface 300 when the electric power mode is the wake mode M2 or the driving mode M3. Processing as in the present flowchart is repeatedly performed by the activation processing unit 3013 for each time a predetermined time elapses when the electric power mode is the wake mode M2 or the driving mode M3. In step S501, the activation processing unit 3013 determines whether or not a shutdown signal has been received. The shutdown signal is sent from the low-voltage ECU 102 of the vehicle platform 100 or the autonomous driving ECU 201 of the autonomous driving platform 200. In a case where the result of the determination in step S501 is positive, the process proceeds to step S502 and in a case where the result of the determination in step S501 is negative, the present routine is terminated with the electric power mode maintained at the wake mode M2 or the driving mode M3.

In step S502, the activation processing unit 3013 transmits the shutdown signal to the low-voltage ECU 102. In a case where the low-voltage ECU 102 has not been shut down yet, the low-voltage ECU 102 is shut down when the low-voltage ECU 102 receives the shutdown signal. Next, in step S503, the activation processing unit 3013 shuts down the entire system of the vehicle control interface 300.

As described above, according to the present example, the electric power modes include the wake mode and thus it is possible to control devices other than a driving system of the vehicle in a state where the vehicle is not able to travel. Therefore, for example, it becomes possible to unlock a door when the vehicle is in a state of being not able to travel.

MODIFICATION EXAMPLE

The above-described embodiments are merely examples and the disclosure can be implemented with appropriate modifications without departing from the gist of the disclosure. For example, the processes or means described in the disclosure can be freely combined with each other as long as there is no technical contradiction.

In the above-described embodiment, the high-voltage battery 501 has been used as an example of the high-voltage electric power source and the low-voltage battery 502 has been used as an example of the low-voltage electric power source. However, instead of such a configuration, regarding the low-voltage electric power source, electric power may be supplied from the high-voltage battery 501 via the DC-to-DC converter 503. In this case, the DC-to-DC converter 503 is configured such that electric power can be supplied to the low-voltage ECU 102 when the low-voltage ECU 102 is to be activated.

In addition, a process that has been described as a process performed by one device may be divided up and performed by a plurality of devices. Alternatively, a process that has been described as a process performed by different devices may be performed by one device. It is possible to flexibly change with what kind of hardware configuration (server configuration) each function is realized in a computer system.

The disclosure also can be realized when a computer program, in which the functions described in the above-described embodiments are mounted, is supplied to a computer and one or more processors of the computer reads and executes the program. Such a computer program may be provided to a computer via a non-transitory computer-readable storage medium that can be connected to a system bus of the computer and may be provided to the computer via a network. Examples of the non-transitory computer-readable storage medium include any type of disk such as a magnetic disk (floppy (registered trademark) disk, hard disk drive (HDD), or like) and an optical disk (CD-ROM, DVD disk, Blu-ray disk, or like), a read only memory (ROM), a random access memory (RAM), an EPROM, an EEPROM, a magnetic card, a flash memory, an optical card, and any type of medium suitable for storing electronic commands.

What is claimed is:

1. A vehicle system configured to control a vehicle provided with a vehicle platform that includes a drive unit configured to drive the vehicle, an auxiliary device not relating to the driving of the vehicle, a first controller configured to perform control relating to traveling of the vehicle with respect to the drive unit, a second controller configured to perform control not relating to traveling of the vehicle with respect to the auxiliary device, a high-voltage electric power source with which the drive unit is operable, and a low-voltage electric power source, which is an electric power source of which voltage is lower than voltage of the high-voltage electric power source and with which the auxiliary device is operable and the drive unit is not operable, an autonomous driving platform that includes a third controller configured to perform autonomous driving control of the vehicle, and a vehicle control interface that connects the vehicle platform and the autonomous driving platform to each other and is configured to acquire a first control instruction including a plurality of commands with respect to the vehicle platform from the third controller, convert the first control instruction into a second control instruction with respect to the first controller or the second controller, and transmit the second control instruction to the first controller or the second controller, the vehicle system comprising a controlling device configured to cause the second controller and the vehicle control interface to enter an operating state and cut off supply of electric power from the high-voltage electric power source to the drive unit, wherein the controlling device switches between a sleep mode in which the first controller, the second controller, and the vehicle control interface enter a stopped state and supply of electric power from the high-voltage electric power source to the drive unit is cut off and a wake mode in which the second controller and the vehicle control interface enter an operating state and supply of electric power from the high-voltage electric power source to the drive unit is cut off, wherein the controlling device makes a switch from the sleep mode to the wake mode in a case where a request for the switch from the sleep mode to the wake mode is input to the vehicle control interface from the third controller.

2. A vehicle system configured to control a vehicle provided with a vehicle platform that includes a drive unit configured to drive the vehicle, an auxiliary device not relating to the driving of the vehicle, a first controller configured to perform control relating to traveling of the vehicle with respect to the drive unit, a second controller configured to perform control not relating to traveling of the vehicle with respect to the auxiliary device, a high-voltage electric power source with which the drive unit is operable, and a low-voltage electric power source, which is an electric power source of which voltage is lower than voltage of the high-voltage electric power source and with which the auxiliary device is operable and the drive unit is not operable,
- an autonomous driving platform that includes a third controller configured to perform autonomous driving control of the vehicle, and
- a vehicle control interface that connects the vehicle platform and the autonomous driving platform to each other and is configured to acquire a first control instruction including a plurality of commands with respect to the vehicle platform from the third controller, convert the first control instruction into a second control instruction with respect to the first controller or the second controller, and transmit the second control instruction to the first controller or the second controller,
- the vehicle system comprising a controlling device configured to cause the second controller and the vehicle control interface to enter an operating state and cut off supply of electric power from the high-voltage electric power source to the drive unit,
- wherein the controlling device switches between a sleep mode in which the first controller, the second controller, and the vehicle control interface enter a stopped state and supply of electric power from the high-voltage electric power source to the drive unit is cut off and a wake mode in which the second controller and the vehicle control interface enter an operating state and supply of electric power from the high-voltage electric power source to the drive unit is cut off, and
- the controlling device makes a switch from the wake mode to the sleep mode in a case where a request for the switch from the wake mode to the sleep mode is input to the vehicle control interface from the third controller.

3. The vehicle system according to claim 1, wherein the controlling device switches between a wake mode in which the second controller and the vehicle control interface enter an operating state and supply of electric power from the high-voltage electric power source to the drive unit is cut off and a driving mode in which the first controller, the second controller, and the vehicle control interface enter an operating state and electric power is supplied from the high-voltage electric power source to the drive unit.

4. A vehicle system configured to control a vehicle provided with a vehicle platform that includes a drive unit configured to drive the vehicle, an auxiliary device not relating to the driving of the vehicle, a first controller configured to perform control relating to traveling of the vehicle with respect to the drive unit, a second controller configured to perform control not relating to traveling of the vehicle with respect to the auxiliary device, a high-voltage electric power source with which the drive unit is operable, and a low-voltage electric power source, which is an electric power source of which voltage is lower than voltage of the high-voltage electric power source and with which the auxiliary device is operable and the drive unit is not operable,
- an autonomous driving platform that includes a third controller configured to perform autonomous driving control of the vehicle, and
- a vehicle control interface that connects the vehicle platform and the autonomous driving platform to each other and is configured to acquire a first control instruction including a plurality of commands with respect to the vehicle platform from the third controller, convert the first control instruction into a second control instruction with respect to the first controller or the second controller, and transmit the second control instruction to the first controller or the second controller,
- the vehicle system comprising a controlling device configured to cause the second controller and the vehicle control interface to enter an operating state and cut off supply of electric power from the high-voltage electric power source to the drive unit,
- wherein the controlling device switches between a wake mode in which the second controller and the vehicle control interface enter an operating state and supply of electric power from the high-voltage electric power source to the drive unit is cut off and a driving mode in which the first controller, the second controller, and the vehicle control interface enter an operating state and electric power is supplied from the high-voltage electric power source to the drive unit,
- wherein the controlling device makes a switch from the wake mode to the driving mode in a case where a request for the switch from the wake mode to the driving mode is input to the vehicle control interface from the third controller.

5. A vehicle system configured to control a vehicle provided with a vehicle platform that includes a drive unit configured to drive the vehicle, an auxiliary device not relating to the driving of the vehicle, a first controller configured to perform control relating to traveling of the vehicle with respect to the drive unit, a second controller configured to perform control not relating to traveling of the vehicle with respect to the auxiliary device, a high-voltage electric power source with which the drive unit is operable, and a low-voltage electric power source, which is an electric power source of which voltage is lower than voltage of the high-voltage electric power source and with which the auxiliary device is operable and the drive unit is not operable,
- an autonomous driving platform that includes a third controller configured to perform autonomous driving control of the vehicle, and
- a vehicle control interface that connects the vehicle platform and the autonomous driving platform to each other and is configured to acquire a first control instruction including a plurality of commands with respect to the vehicle platform from the third controller, convert the first control instruction into a second control instruction with respect to the first controller or the second controller, and transmit the second control instruction to the first controller or the second controller,
- the vehicle system comprising a controlling device configured to cause the second controller and the vehicle control interface to enter an operating state and cut off supply of electric power from the high-voltage electric power source to the drive unit, wherein the controlling device switches between a wake mode in which the second controller and the vehicle control interface enter an operating state and supply of electric power from the high-voltage electric power source to the drive unit is cut off and a driving mode in which the first controller, the second controller, and the vehicle control interface enter an operating state and electric power is supplied from the high-voltage electric power source to the drive unit, wherein the controlling device makes a switch from the driving mode to the wake mode in a case where a request for the switch from the driving mode to the wake mode is input to the vehicle control interface from the third controller.

6. The vehicle system according to claim 1, wherein:
   the first control instruction is data that is not interpretable by the first controller and the second controller that the vehicle includes; and
   the second control instruction is data that is interpretable by the first controller and the second controller.

* * * * *